United States Patent [19]

Yosiaki et al.

[11] Patent Number: 5,683,483
[45] Date of Patent: Nov. 4, 1997

[54] MANUFACTURING METHOD AND EQUIPMENT FOR LARGE, HIGH-PURITY FLAT OR CURVED QUARTZ GLASS PLATE

[75] Inventors: Ise Yosiaki, Yamagata; Asajima Kazuo, Fukui-ken; Okosi Shinichi, Yamagata; Kimura Hiroyuki, Fukui, all of Japan

[73] Assignee: Shin-Etsu Quartz Products Co., Ltd., Tokyo, Japan

[21] Appl. No.: 211,455
[22] PCT Filed: Jul. 31, 1994
[86] PCT No.: PCT/JP92/00976
§ 371 Date: Jun. 15, 1994
§ 102(e) Date: Jun. 15, 1994
[87] PCT Pub. No.: WO94/03404
PCT Pub. Date: Feb. 17, 1994
[51] Int. Cl.⁶ ............................ C03B 23/02; C03B 23/04
[52] U.S. Cl. .......................... 65/102; 65/64; 65/67; 65/106; 65/120; 65/244; 65/269; 65/271; 65/276; 65/278; 65/279; 65/283; 65/292; 65/DIG. 8; 65/DIG. 9
[58] Field of Search .................... 65/67, 63, 35, 65/102, 90, 108, 109, 120, 244, 271, 276, 278, 279, 281, 283, 269, 292, 64, DIG. 8, 106, DIG. 9; 501/54; 428/98, 220

[56] References Cited

U.S. PATENT DOCUMENTS

| 1,283,333 | 10/1918 | Shaw | 65/67 |
| 3,740,207 | 6/1973 | Bogerts et al. | 65/67 |
| 4,612,023 | 9/1986 | Kreutzer et al. | 65/DIG. 8 |

FOREIGN PATENT DOCUMENTS

| 150431 | 6/1942 | Japan . | |
| 42-22389 | 11/1967 | Japan | 65/67 |
| 62-235223 | 10/1987 | Japan . | |

OTHER PUBLICATIONS

Taro Moritani et al., "Glass Engineering Handbook", Apr. 20, 1964, Asakura Shoten, p. 611, Clause 2.1 Fabrication.

*Primary Examiner*—Steven P. Griffin
*Attorney, Agent, or Firm*—Keck, Mahin & Cate

[57] ABSTRACT

The present invention provides large, high-purity quartz glass plate with a high degree of smoothness and flatness, its manufacturing method and equipment. The invention is characterized by the procedure in which a quartz glass tube with an opening over a specific width, in the direction of the tube shaft, that is preferably band-shaped, is heated and softened in a band-shaped area over the entire width, in the direction of the tube shaft, progressing sequentially along the direction of tube circumference from a specific position on the glass tube. While softening and heating, the quartz glass tube is pulled in a line approximately tangential to the specific position to flatten the glass tube.

19 Claims, 5 Drawing Sheets

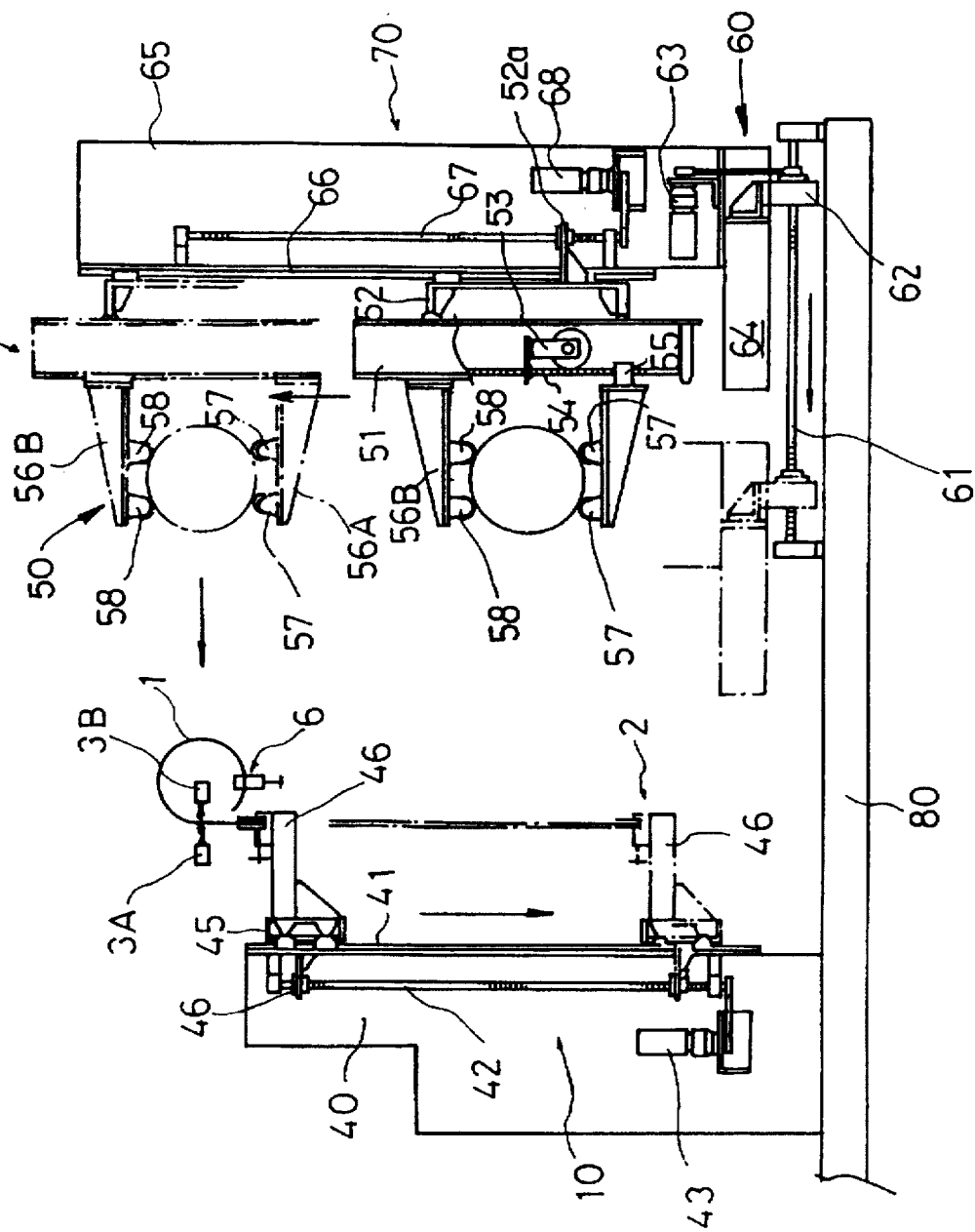

MANUFACTURING METHOD AND EQUIPMENT FOR LARGE, HIGH-PURITY FLAT OR CURVED QUARTZ GLASS PLATE

FIELD OF THE INVENTION

The present invention relates to large quartz glass plate and the manufacturing method and equipment to produce it. In particular, the present invention relates to large quartz glass plate of high transparency and purity, in the form of flat plate and the manufacturing method and equipment to produce it.

BACKGROUND OF THE INVENTION

Large, flat quartz glass plate of high purity and transparency has typically been used as material for manufacturing square tanks for washing high-purity elements, such as wafers, large diameter quartz glass observation ports and lamp covers, where the adhesion of impurities must be avoided. Compared to other glass materials, the quartz glass used for these applications retains high viscosity even at high temperatures, which makes it difficult to form and cast it when it is melted and, therefore, difficult to form it into plate.

Generally, there are two existing methods by which such quartz glass plate is produced. One is by cutting a block of quartz glass into thin sheets. The other is a process in which a quartz glass tube is opened to form a quartz glass plate.

The prior art applied in the former method employs a technology in which plate is formed from pulverized powder by refining natural crystal or quartzite and then heating the powder electrically or with a gas burner to melt and fuse it into a block of quartz glass, which is then cut into plate using a diamond cutter or the like. However, as this method involves cutting blocks of quartz glass with a diamond cutter or the like, the surface of the plate thus obtained is rough, necessitating a surface smoothing treatment, such as a special separate polishing operation to make the surface transparent.

Quartz glass is a material with superior transparency and light transmission, and particularly in applications such as observation ports, lamp covers and the like, the material is usually required to have excellent optical transparency. Therefore, it is necessary to perform transparency finishing with some type of surface treatment, for example, surface fusing with fire or specular glossing with a granular abrasive after the coarse polishing on the plate material, which leaves a rough surface and reduced transparency as described in the previous paragraph. This transparency finishing treatment is extremely labor intensive and time consuming. Moreover, during the polishing with the granular abrasive, the material can be easily contaminated by impurities and metal elements which will have detrimental effects on semiconductors. In the surface fusing treatment using fire, thermal distortion tends to cause cracking, so this method is highly disadvantageous from an industrial point of view.

Also, because the aforementioned block forms are manufactured by melting and fusing a pulverized powder of natural crystal or quartzite in a special die, impurities or reactive gasses originating in the die body, as well as residual gasses within the melted substance tend to be retained in the form of bubbles in the melted, high viscosity quartz glass. Since this tendency becomes more pronounced as the size of the block body increases, inevitably there are foreign substances and bubbles in large plate cut from such blocks. This makes it difficult to use such plate for products that require a high degree of transparency such as quartz glass observation ports and lamp covers.

Also, because of the poor mechanical strength and heat resistance of the die used for melting and fusing the quartz powder, the prior art has substantial restrictions on the size of the block body that can be obtained. Furthermore, if large plate material is to be obtained from such large blocks, the thickness of the diamond cutter needs to be increased, resulting in a great deal of expensive quartz glass lost to the cutting margin. Thus, not only is it extremely disadvantageous from an industrial point of view, the resulting plate material is uneconomical. In summary, this method for the production of large quartz glass plate has a number of serious drawbacks. Moreover, the size of square washing tank that can be manufactured from such quartz glass plate is restricted to the limited size of the plate itself and it is becoming more and more difficult to keep up with the demand for ever larger-diameter semiconductor wafers and the like, and the tanks required for washing them. Meanwhile, in the latter mentioned prior art (tube opening), as illustrated in FIG. 5, for example, a quartz glass tube 100 is slit open in the direction of the axis or the quartz glass tube is cut into two and a quartz glass dowel is welded, centered onto its edge, to form an operating handle 101. While holding the handle 101, the opened quartz glass tube 100 is heated and softened all over. Next, the whole quartz glass tube is opened into a curved plate, then while heating and softening part of it, the softened section 100a is pressed and flattened on a carbon plate 103 with a carbon press 104 or the like. After that, the operation is repeated while the welded position of the handle 101 is relocated to flatten other areas sequentially in stages to create the quartz glass plate.

Another method of the prior art is that in which the quartz glass tube 100, already opened in the form of a curved plate as described above, is then sandwiched between carbon slabs while being heated and softened to make it into a flat plate.

However, this entire operation must be carried out manually. Therefore, the plate thickness and size are necessarily restricted. Generally speaking, the maximum size that can be produced in this way is approximately 300×300 mm. Moreover, this operation is very time consuming and requires a great deal of experience.

Also, as the aforementioned flattening methods involve the use of a carbon press or carbon slabs pressing against the curved plate, scoring will occur, caused by contact with the carbon press or slab. Irregularities on the surface of the carbon tends to become imprinted on the surface of the plate, making it rough. Furthermore, surface undulations resulting from uneven flattening processes also occurs. Thus, smoothing and flattening results in these methods are erratic. There is also the fact that, as the carbon press, carbon slabs or carbon plate comes in contact with the upper surface of the quartz glass under pressure, the quartz glass also comes in contact with impurities and they tend to remain in the glass. This makes it even more difficult to manufacture high-purity flat plate. These residual impurities not only poison the semiconductors, they also accelerate the crystallization of the quartz glass itself so that it becomes opaque (devitrified). This is due to microcracking, which results from local crystallization and which creates even more problems in terms of applications that require a high degree of transparency.

The objective of the present invention is to address these problems of the prior art: to provide large quartz glass plate with no bubbles and to provide a manufacturing method and manufacturing equipment to produce them.

Another objective of the present invention is to provide quartz glass plate with no surface waviness or surface roughness, with a high degree of flatness and to provide a manufacturing method and manufacturing equipment to produce them.

SUMMARY OF THE INVENTION

In the present invention, as illustrated in FIGS. 1 and 2, a quartz glass tube 1 with a band-like opening 1a running over a specific width in the direction of the tube shaft, the opening being preferably long and narrow. Then, while heating and softening a band-like area of the glass tube 1 over the entire width in the direction of the tube shaft, starting from a specific position along the direction of the tube circumference and working sequentially, the quartz glass tube is stretched in a line approximately tangential to the circumference of the glass tube from the aforementioned specific position to make the glass tube 1 into a flat plate.

Alternatively, it is possible to fix the glass tube 1 in one place and rotate the heating bodies in the direction of the circumference to heat and soften the glass over the length of the opening in the direction of the tube shaft while the means of pulling is rotated spirally in such a way that it follows the rotation of the heating bodies, resulting in pulling and unfurling the tube in a linear fashion, approximately tangential to the circumference. However, it is preferable to fix the position of the heaters 3A and 3B in the vicinity of the leading edge 1b of the opening in the quartz glass tube 1, and rotate the tube opening along the external circumference of glass tube 1 in the direction of the circumference, and along with that rotation, the means of pulling 2 that has the leading edge 1b of the glass tube 1 fixed onto it, is made to pull linearly in an approximately tangential direction from the opening leading edge 1b to make the glass tube 1 into a flat plate.

It should be noted that the initial heating position for the heating bodies 3A and 3B, is not necessarily set at the leading edge 1b of the opening. For example, if the means of pulling 2 grips the leading edge 1b of the opening, it may not be possible to directly heat the leading edge 1b of the opening. In this case, heating may be started at a position slightly further in than the leading edge 1b of the opening, out of the way of the gripped area.

Also, the peripheral speed of the quartz glass tube 1 and the pulling speed of the means of pulling 2 are not necessarily the same. By setting these speeds appropriately, it is possible to adjust the thickness of the formed flat plate thicker or thinner in relation to the thickness of the glass tube 1. For example, by setting the pulling speed higher than the peripheral speed of the quartz glass tube 1, large, flat glass plate thinner than the tube material can be produced. Conversely, by setting the pulling speed slower than the peripheral speed of the quartz glass tube 1, large, flat glass plate thicker than the tube material can be produced.

This structure can be embodied by making the means of pulling 2 directly grip the leading edge 1b of the opening in the quartz glass tube 1. It would be difficult to form a high-purity quartz glass plate if the grip was made of a metal, since impurities would enter from the grip due to the heat during the heating and softening process. Therefore, it is desirable to grip with a high-purity, highly heat resistant carbon or ceramic material such as alumina, SiC, zirconia, silicon nitride or the like. However, it is still quite difficult to completely eliminate contamination of impurities spreading from the grip area.

Therefore, it is ideal to pull without grips directly gripping the leading edge 1b of the opening but rather by gripping a connecting piece of quartz glass material 4.

Also, the heating of the aforementioned glass tube 1 may be performed from one side. However, if there is a difference in temperature between the front and rear sides, consistent and even pulling becomes difficult. Therefore, preferably, heating should be done from both the front and rear of the quartz glass tube 1 over the entire width in the direction of the tube shaft. The aforementioned heating bodies 3A and 3B may take the form of bar heating bodies made of SiC, carbon or the like. Or, another possible structure is a body of integrated burners in which a great number of burner nozzles are arranged in a row. When using heating bodies 3A and 3B thus prepared, it is advisable to move them in a reciprocating motion in the heating area relative to the quartz glass tube 1 in the direction of the tube shaft in order to eliminate inconsistency of heat supply in the direction of the shaft of the quartz glass tube 1. It will be even more preferable to soften the glass tube 1 over the entire width in a band-like area while moving the heating bodies 3A and 3B in a reciprocating motion.

Since the heat source may be placed inside the quartz glass tube 1 which is the base material in the present invention, it is not feasible to use a tube with an extremely small diameter. In practice, it is desirable to use a transparent quartz glass tube with a diameter ranging from 100 to 500 mm and a thickness of 2 to 20 mm.

Also, as mentioned earlier, for use in observation ports or square tanks, the quartz glass plate should have a high degree of transparency and purity. To be more specific, the total content of the following elements: Na, Li, Fe, Al, Cu, Ca, Ni, B, Mg, Y, Ti and Cr, should be 100 ppm (weight) or less. Even more preferably, the content of elements such as Na, K and Cu and especially Ca, which contaminates particularly easily, should be 0.5 ppm or less.

The present invention relates to a method in which flat plate material is formed from a quartz glass tube 1 having a wall defined by inner and outer surfaces, and also relates to the reverse process, in which a large quartz glass plate is provided and then heated and softened linearly from one end to the other sequentially over the entire width, and is simultaneously pulled in an arcuate direction that it becomes curved from one end to a specific shape in order to form a curved glass plate.

The second aspect of the present invention provides optimum equipment for implementing the manufacturing method comprising a quartz glass tube 1 which has an opening 1a of a per-selected width which extends the entire length of the tube parallel to the tube axis, preferably in the form of a band, opening 1a is defined by a leading edge 1b and a trailing edge 1c which extend between the inner and outer surfaces of the tube wall. Edge 1b and 1c extend the entire length of tube 1, so that opening 1a is of commensurate length. Means 5 are provided to rotate the aforementioned glass tube 1 with its axis as the center of the rotation and means 2 are present for pulling the unfolding wall of glass tube 1 in a line approximately tangential to the leading edge 1b of the opening in the glass tube 1 while the glass tube 1 is heated and softened in a band-like area over the entire length of the tube.

It is difficult to rotate the quartz glass tube around the tube shaft center with a high degree of precision because the inside of the glass tube 1 is hollow. Therefore, in the present invention, means 6 for supporting the quartz glass tube 1 on its outer circumferential surface is provided and the present invention is embodied by a structure in which the shaft center of the means 5 of rotation and the center of the shaft of the quartz glass tube 1 are made to align and coincide. In this structure, the means 6 of support and means 5 of rotation are structured so that they can move freely in the plane of cross section of the glass tube.

In order for the glass tube 1 to be pulled in the direction of a line tangential to the leading edge 1b of the opening, it is required that the trailing edge 1c of the opening that faces the leading edge 1b of the opening, be positioned at a location that does not intersect the line tangential to the leading edge 1b. Therefore, it is desirable to structure the apparatus in such a way that it is possible to set the initial support position of the means of support for the quartz glass tube 1 at a location that makes the leading edge 1b of the opening further out, horizontally, from a vertical line through the center of the tube shaft, than the trailing edge 1c of the opening. At the same time, it may sometimes be difficult to form a high-purity quartz glass plate if the means 5 of rotation is structured so that it directly grips the leading edge 1b of the opening in the quartz glass tube 1 by using a clamping member or the like, because impurities are likely to be transferred from the clamping member at the time of heating and softening.

Therefore, preferably, the structure of the means 5 of rotation should be a rotating plate or arm member that can rotate around the rotating shaft as the center of rotation without the clamping member directly gripping the leading edge 1b of the opening. It is preferable to structure it in this way; some quartz glass material 8 or the like is fused to the trailing edge 1c of the opening of the glass tube 1, that is clamped by the arm member, thus making it possible to rotate the quartz glass tube 1 in conformance with the rotation of the arm part.

In equipment which does not flatten the trailing edge 1c of the opening, the gripping member that grips the trailing edge 1c of the said opening via a carbon or ceramic material with high heat resistance, including alumina SiC, zirconia, silicon nitride and the like, first clamps and secures the trailing edge 1c of the opening of the glass tube 1 and then the quartz glass tube 1 rotates in conformance with the rotation of the arm member. This structure is possible in equipment wherein the flattening means does not cover the trailing edge 1c. If the gripped section is cut off after the flat plate is formed, then a high-purity quartz glass plate can be obtained.

In this case too, it is possible to adjust the thickness of the flat plate appropriately by controlling the relative peripheral speed of rotation of the quartz glass plate and the pulling speed of the means 2 of pulling.

Therefore, it follows that it is desirable to provide a means of changing speed to enable relative speed changes for the peripheral speed of the quartz glass tube 1 that rotates by means 5 of rotation and the speed of the means 2 of pulling.

As stated earlier, in order to achieve a high degree of purity, it is desirable to link the means 2 of pulling and the leading edge 1b of the opening of the quartz glass tube 1 with quartz glass. Furthermore, in order to make it possible to heat the glass tube 1 from both inside and outside, it is advisable that the means of heating be structured with the heating bodies 3A and 3B, being a pair of bar heaters that are placed facing each other across the glass tube 1, or heating bodies 3A and 3B can take the form of burners or the like, in which case, the pair of heating bodies 3A and 3B are moved back and forth in the direction of the tube shaft to evenly soften a band-shaped area over the entire length of the glass tube 1.

In addition, it is required that the quartz glass tube 1 that can be processed with the aforementioned equipment have a diameter of at least 100 mm because it is manufactured by pulling the glass tube 1 from the leading edge 1b of the opening in the direction of a tangential line. Also, if it is too thin, it will be deformed at the time of heating and softening and if it is too thick, heating cannot be done evenly. Therefore, the ideal thickness is 2–20 mm.

A flat plate which is manufactured thus from such a quartz glass tube 1 will be a flat, high-purity, high transparency quartz glass plate with its long side at least 300 mm with a thickness of 2–20 mm.

Also, as the afore-mentioned quartz glass tube 1 is formed from a relatively small quartz glass ingot, it has almost no bubbles or impurities present, as is likely in a large block. Therefore, a quartz glass plate formed from this ingot will have a high degree of purity and transparency, ideal for observation ports and square tanks. Also, since factors that could introduce impurities during manufacturing are minimized, it is possible to form a transparent quartz glass plate in which the total content of the following elements; Na, Li, Fe, Al, Cu, Ca, Ni, B, Mg, Y, Ti, and Cr is 100 ppm (weight) or less. Furthermore, the content of elements such as Na, K and Cu and especially Ca, which contaminates particularly easily, can be held down to 0.5 ppm or less. The resulting transparent quartz glass plate will be ideal for observation ports, single-crystal, pull-up devices and square wash tanks for wafers.

Furthermore, by using a synthetic quartz glass for the aforementioned quartz glass tube 1, it is possible to keep the total content of the following elements: Na, Li, Fe, Al, Cu, Ca, Ni, B, Mg, Y, Ti and Cr at a maximum of 200 ppb.

The manufacturing of a quartz glass plate with such high degree of purity and transparency can only be achieved by keeping the quartz glass tube 1 out of contact with any jig other than one made of quartz glass during the manufacturing process.

BRIEF DESCRIPTION OF THE DRAWINGS

FIG. 3 is a front view of the overall structure of the equipment.

PREFERRED EMBODIMENTS OF THE PRESENT INVENTION

Figure 1:
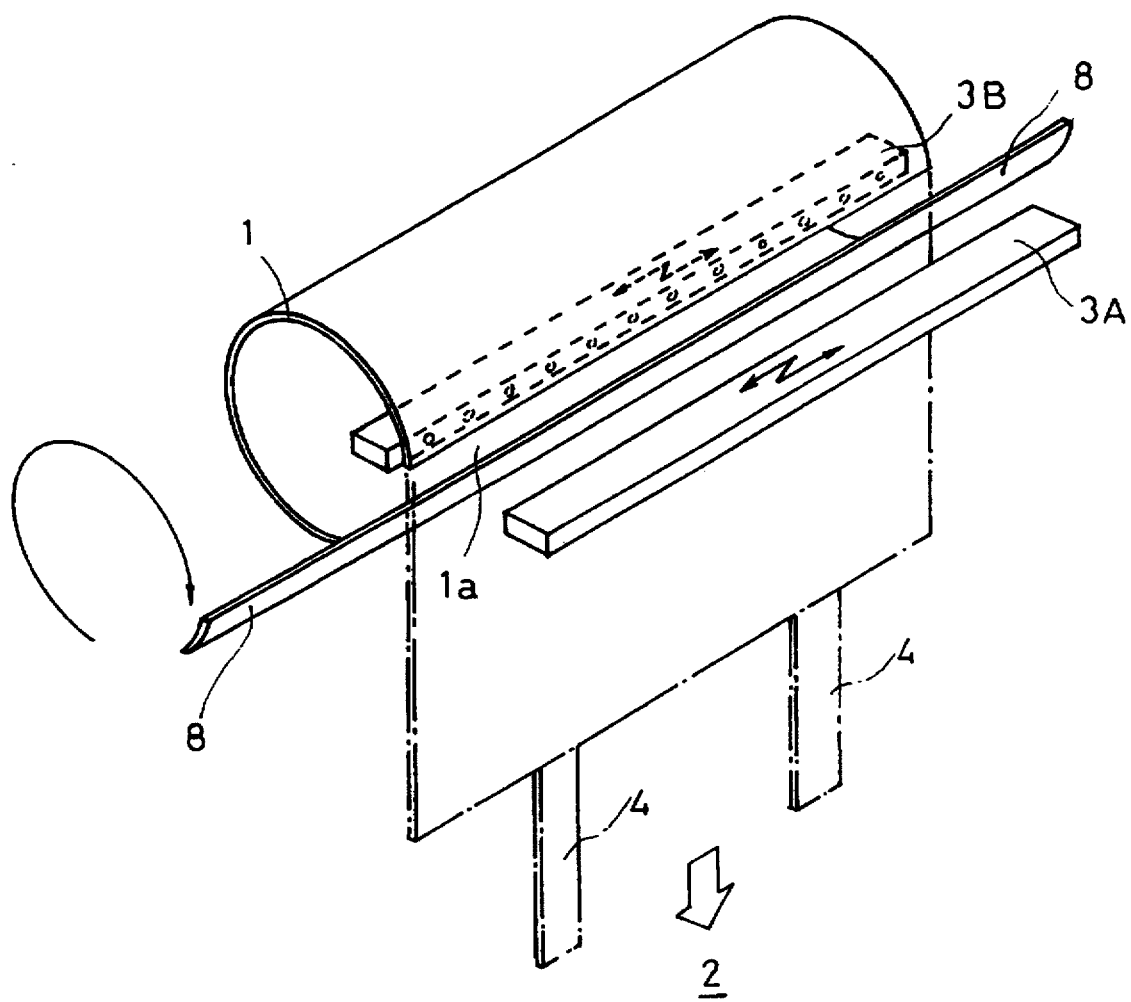
FIG. 1 is a basic structural diagram of the manufacturing system of the present invention.

The present invention is described by referring to the drawings which are embodiments of the invention. However, the present invention should not be interpreted as being confined to these examples only. It is self evident that many variations in dimension, materials, forms and relative arrangement can be achieved within the scope of the present invention whereby the objectives of the present invention and other objectives and the accompanying benefits will be attained.

FIG. 3 shows a overall structural view of the flat plate manufacturing system in an embodiment of the present invention, which includes a support mechanism 50 that supports a quartz glass tube 1 which has a band-like opening 1a running between leading and trailing edges 1b and 1c in the direction of the tube longitudinal axis. Tube 1 is supported with two pairs of support rollers 57, 58, one each at the top and bottom, which form part of a support delivery device 70 consisting of a delivery mechanism 60 that transports the support mechanism 50 to a specific position in front of the flat plate forming device 10. Rotation 5 are provided as part of the apparatus controlling rotation of the quartz glass tube 1 around its axis of rotation. Heater means 3A and 3B are provided to heat and soften the glass tube 1 in a band-shaped area over the entire length of the tube shaft. The flat plate forming device 10 having means 2 that pulls the heated and softened glass tube 1 in a line approximately tangential to the leading edge 1b of the opening. Pulling means 2 includes pulling table 45 (see FIGS. 3 and 4) which is operably connected to horizontal arms 46. Arms 46 are in turn mounted on vertical guide rails 41 for movement between the upper and lower positions shown in FIG. 3. Movement of table 45 and arms 46 is accomplished by drive motor 43 and the vertical screw shaft 42 which it rotates. Numeral 40 designates the vertical tower on which the parts 41, 43, 45, and 46 are mounted.

Next, each device is explained in detail.

The delivery mechanism 60 consists of a screw shaft 61 that is provided on the base body 80 and runs horizontally, extending towards the flat plate forming device 10, a horizontal table 64 that advances toward, and withdraws from the flat plate forming device 10 by means of forward and reverse rotation of the drive motor 63 via the nut section 62 that is threaded on to the said screw shaft 61 and the vertical tower 65 that is erected vertically on the horizontal table 64. On the front of the vertical tower 65, a vertical guide rail 66 is provided and inside the tower 65, a vertical screw shaft 67 is provided that extends vertically, parallel with the guide rail 66. A drive motor 68 that rotates the said vertical screw shaft 67 in both forward and reverse directions is also provided in is also provided in the tower. The vertical stay section 51 is securely mounted in a bracket frame 52, which is fitted to the guide rail 66 so that the bracket frame can be freely elevated and lowered, being linked to the vertical screw shaft 67 via the nut section 52a.

As a result, the support mechanism 50 is elevated and lowered via the bracket frame 52 along the guide rail 66 by rotating the vertical screw shaft 67 in the forward and reverse directions, driven by the drive motor 68.

The support mechanism 50 consisting of the drive motor 53 and the vertical stay 51, in which a rotating screw shaft 54 rotates in the forward and reverse directions, driven by the drive motor 53, is vertically mounted, extending almost the entire length of the stay. A pair of support stays 56A and 56B are elevated and lowered, traveling toward and away from each other through the reverse and forward rotation of the rotating screw shaft 54 on to which the nut section 55 is threaded.

The support stays 56A and 56B extend horizontally from the vertical stay 51 where the aforementioned nut section 55 is mounted, to support the pairs of support rollers 57 and 58 at their shafts which are located one pair each on the upper and lower surfaces that face each other. Between the support rollers 57 and 58, it is possible to clamp and secure the quartz glass tube 1.

After mounting the quartz glass tube 1 on the pair of support rollers 57 on support stay 56A, the quartz glass tube 1 can be clamped as the two support stays 56A and 56B approach each other by rotating the screw shaft 54 in the forward direction through the drive motor 53.

Figure 4:
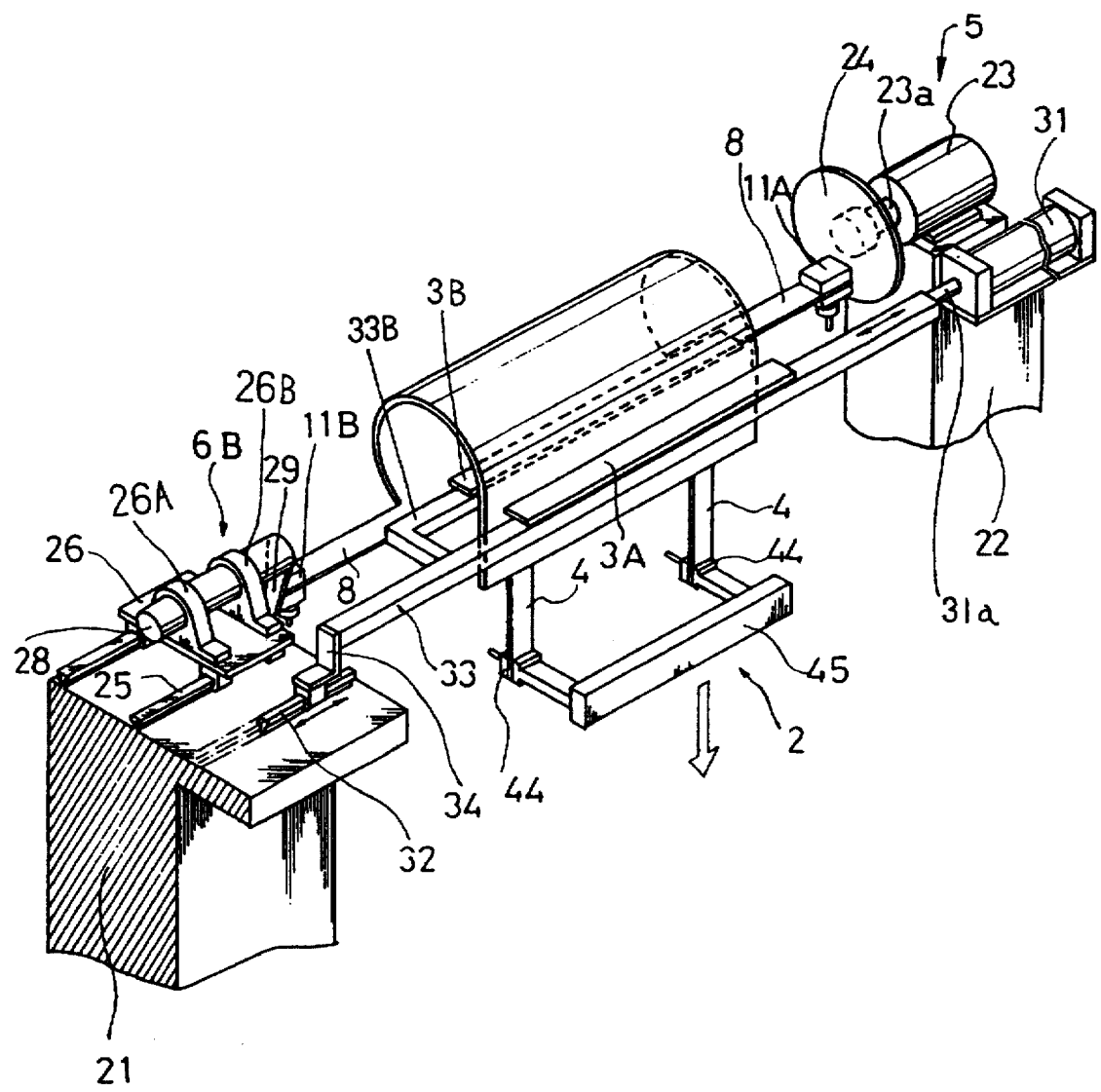
FIG. 4 is a perspective view of the structure of key parts.
Figure 5A:
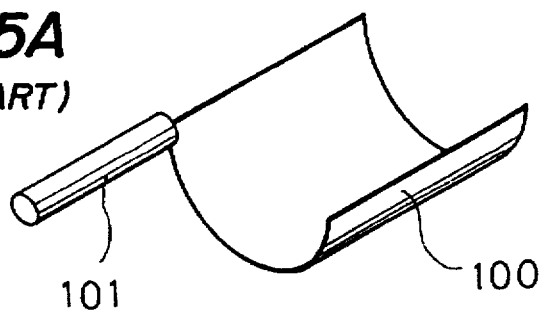
FIGS. 5 (A–C) show the prior art process in which a quartz glass tube is flattened into a plate.
Figure 5B:
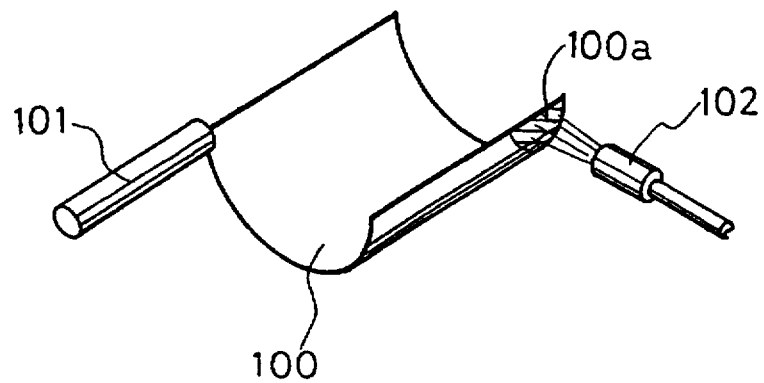
Figure 5C:
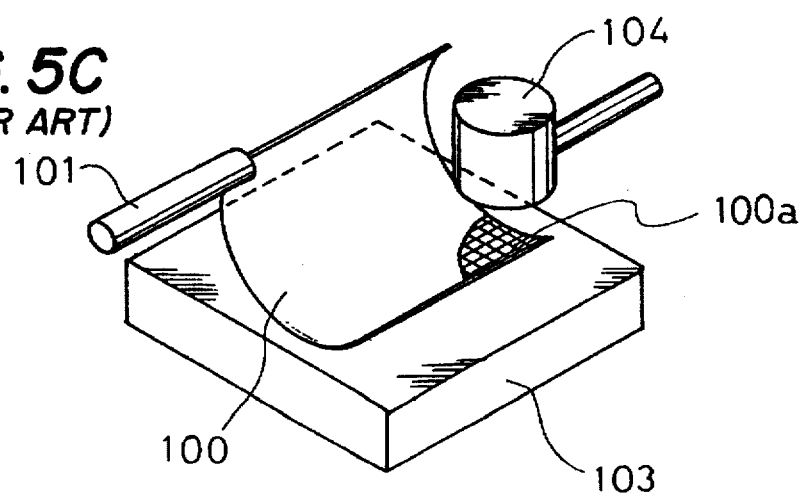

Next, the structure of the flat plate forming device 10 is explained using FIG. 4.

First, the means 5 of rotation includes support bases 21 and 22, located on either side in the direction of the shaft and a space between them for placing the quartz glass tube 1. On one of the bases 22, a drive motor 23 is provided with an attached rotating plate 24. On the base 21, which is on the opposite side, across the space provided for the glass tube 1, a driven rotating mechanism 6B is provided, aligned with the extended line of the shaft of the drive motor 23.

The circular rotating plate 24 is mounted facing opposite the quartz glass tube 1 on the rotating shaft 23a of the drive motor 23. On the rotating plate 24, a clamping member 11A is provided to clamp the band like glass plate 8, one edge of which is fused to the trailing edge 1c of the opening in the quartz glass tube 1.

The distance between the center of the rotating plate 24 and the clamping position of the clamping member 11A (radius) must match the diameter of the quartz glass tube 1.

Meanwhile, on the other base 21, the driven rotating mechanism 6B includes a pair of shaft bearings 27 that are mounted on a sliding table 26 which can move along the two parallel rails 25 which extend across the base 21 in the direction of the shaft. The large diameter shaft 28, the axis of which is aligned with the axis of rotating shaft 23a of the drive motor 23, can rotate within shaft bearings 27. A rotating arm 29 that extends from the tip of the shaft 28 perpendicular to the axis, includes the clamping member 11B attached at the tip of the arm 29, for the band-like glass plate 8, one edge of which is fused to the trailing edge 1c of the opening in the quartz glass tube 1. Also, as with the aforementioned rotating plate 24, the distance between the center of the aforementioned large diameter shaft 28 and the clamping position of the clamping member 11B (radius) must be the same as the radius of the quartz glass tube 1.

At the same time, on support base 22 a hydraulic cylinder 31 is mounted parallel with the axis that connects the drive motor 23 and the large diameter shaft 28. On the other base 21, a guide rail 32 is provided along the same axis. These two rails are bridged by a support body 33, which is provided with a pair of heating bodies 3A and 3B mounted on to it. One end of the support body 33 is secured on to the shaft section of the hydraulic cylinder 31 and the other end is secured on to the perpendicular bracket 34 which is fitted onto the guide rail 32 in such a way that back and forth movement of the structure is possible along the axis by advancing and retracting the hydraulic cylinder 31. A sub support body 33B that is bent to form an L shape is provided at the half way position through the range of movement along the axis so that it is opposite support body 33, facing it across the leading edge 1b of the opening in the quartz glass and lowered freely. On the front of the pulling table, clamping members 44 are provided to clamp the band-like glass plate 4.

The pulling table 45, as shown in FIG. 4, has arm sections on both sides extending toward the quartz glass tube 1 with the clamping members 44 for the band-like glass plate 4, one end of which are bonded to the leading edge of the opening 1b in the quartz glass tube 1 and the other end of which extends vertically down to the clamping members 44 attached to the end of the arm sections. In addition, the drive motor 23 must have an internal speed changer so that its rotating speed can be freely adjusted.

Next, the actual method of manufacturing a flat plate based on this embodiment is explained.

A high-purity, high transparency quartz glass tube 1 with an external diameter of 240 mm and a thickness of 4 mm is cut to a length of 500 mm. Then a band-like opening is created in the tube to a width of θ: approximately 10°–15° (approximately 30 mm) to create an opened quartz glass tube 1. The impurity contents of the glass tube 1 is 200 ppb or less in total content of Na, Li, Fe, Al, Cu, Ca, Ni, B, Mg, Y, Ti and Cr.

Next, place the quartz glass tube 1 on the pairs of support rollers 57 and 58 on the support stays 56A, 56B at the lower part of the delivery mechanism 60 so that the leading edge 1b of the opening is set on the horizontal line and the trailing edge 1c of the opening is vertically displaced from the leading edge 1b toward the inside by a distance h as shown in FIG. 2 (A).

It should be noted that the aforementioned distance h can be any distance as long as there is no hindrance to the band-like glass plate 4, a more detailed explanation of which will be given later, which is fused to the leading edge 1b of the opening for pulling the glass tube 1. Likewise, the opening angle θ can be set arbitrarily within the range of 10°–15° according to the distance required.

After the quartz glass tube 1 is set in the specific position, it is positioned with the lower and upper support stays 56A and 56B which approach each other by rotating the drive motor 53 within the vertical stay 51 and then the quartz glass tube 1 is held within the upper and lower pairs of support rollers 57 and 58.

Then the support mechanism 50 that is now holding the quartz glass tube 1 first elevates the quartz glass tube 1 via the drive motor in the vertical tower 65, to a height that matches the axis of the means 5 of rotation on the flat plate forming device 10. Then it moves the glass tube 1 horizontally to a position that is aligned with the axis of the means 5 of rotation on the flat plate forming device 10 by sliding the horizontal table 64.

The piston shaft 31a of the hydraulic cylinder 31 must be extended so that the glass tube 1 will not contact the sub-support body 33B of the heating mechanism 3A.3B at this time.

Figure 2A:
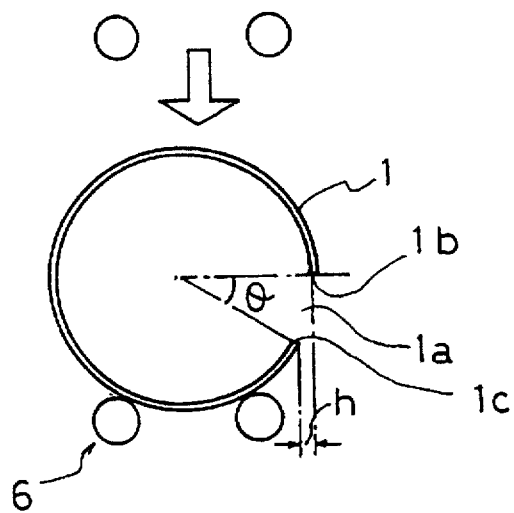
FIGS. 2 (A–D) are a series of operation diagrams showing the manufacturing process.
Figure 2B:
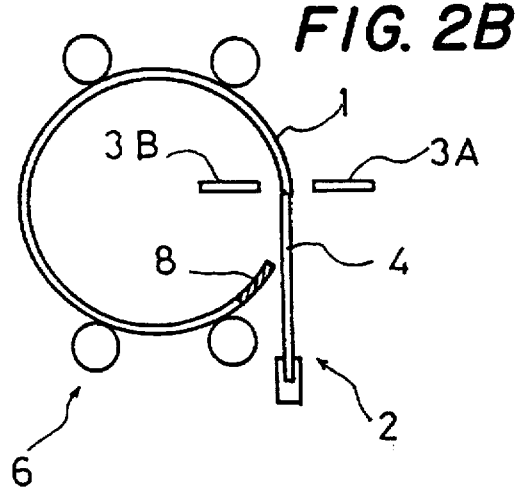

Then, as shown in FIG. 2(B), band-like quartz glass plates 8 made of high-purity synthetic quartz glass are fused horizontally in the direction of the shaft on to each end of the tube aligned with the trailing edge 1c of the opening. Then, each of them is clamped by clamping member 11a of the rotating plate 24, or the clamping member at the end of the rotating arm 29.

Next, in a similar manner, band-like quartz glass plates 4 are fused on to the end surface of the leading edge 1b of the opening at both the right and left sides in such a way that they will extend vertically downwards along a line tangential to the quartz glass tube 1 and their lower ends are clamped by the clamping members 44 of the pulling table 45.

When thus secured, the drive motor 53 inside the vertical stay 51 is rotated in the reverse direction to increase the distance between the lower and upper support stays 56A and 56B which have been positioning and supporting the quartz glass tube 1. Then, the delivery mechanism 60 is retracted from the supporting position and returned to its original position.

Then the hydraulic cylinder 31 is retracted so that the sub-support body 33 of the heating mechanism 30 can enter the quartz glass tube 1. Overall, it should be structured so that heating bodies 3A and 3B can face each other across the leading edge 1b of the opening at this time.

Figure 2C:
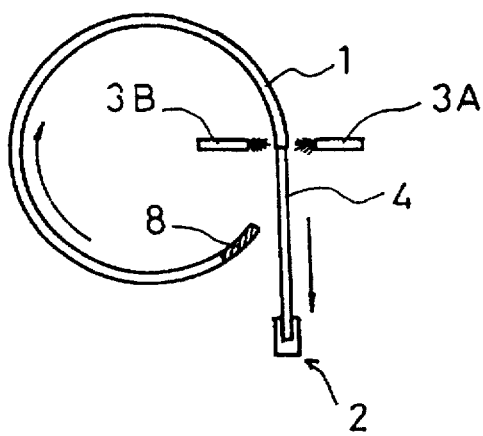

Now we are ready to start the actual flattening operation. First, as shown in FIG. 2(C), fuel gas is ejected from the heating bodies 3A and 3B from the inside and the outside of the tube in a horizontal direction so that the gas will be supplied over the entire width of the tube shaft. At this time, if the heating bodies 3A and 3B have rows of nozzle burners, the line of heating tends to be uneven because of the intervals between the burners. If that is the case, consistent even heating can be achieved by moving the heating bodies back and forth by using the hydraulic cylinder 31 with strokes that are slightly longer than the distance between the burners.

When the leading edge 1b of the opening has been heated and softened over the entire line of heating, the rotation of the quartz glass tube 1 by the drive motor 23 and the lowering of the leading edge 1b of the opening by means 2 of pulling are begun together.

At this time, if the pulling speed is made to perfectly match the rotation speed throughout the entire period, then the thickness of the resulting flat plate will be exactly the same as that of the quartz glass tube. If the pulling speed is set slightly higher, a flat plate that is slightly thinner will result. Conversely, by making the pulling speed slower, a flat plate that is slightly thicker than the quartz glass tube 1 will result.

Figure 2D:
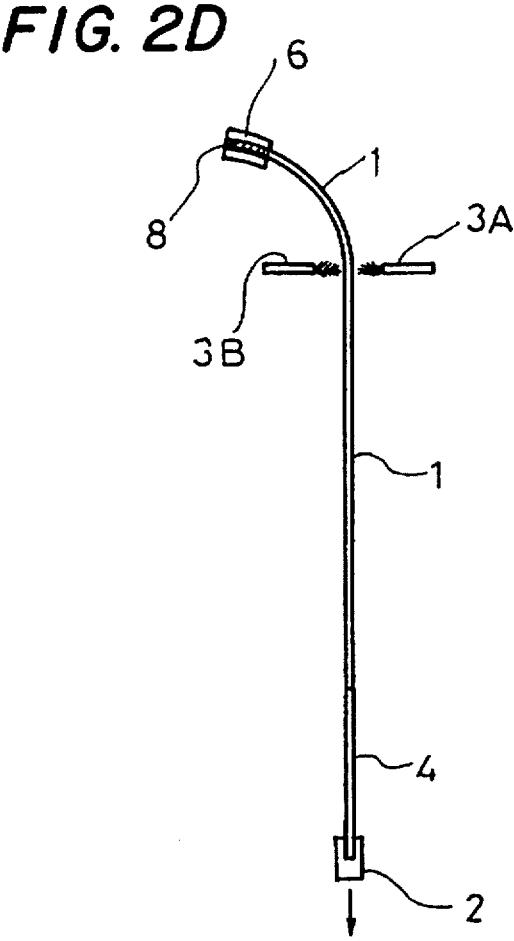

In the manner described above, plate forming is performed to the position indicated in FIG. 2(D). Immediately before the trailing edge 1c of the opening of the quartz glass tube 1 reaches the position of the heating bodies 3A and 3B, the three operations; heating by the heating bodies 3A and 3B, rotation by means 5 of rotation and pulling by means 2 of pulling, are all stopped simultaneously.

After the band-like quartz glass plates which have been fused as described earlier, are severed and the quartz glass plate which has been flattened as described above is removed from the forming device 10, the section at the trailing edge 1c of the opening which has not been flattened is cut off to form a completed flat plate. Then, when specified finishing treatments, such as washing, annealing or the like have been performed, the plate is ready to be shipped as a product.

We have examined the purity of plate thus manufactured and in every case we have found that it is desirable to combine a transaction guide mechanism in the lower section.

The quartz glass plate thus stretched into a flat plate in this manner is then cooled and formed into a large, high transparency quartz glass plate. The plate prepared in this manner does not have any waviness on the surface and the impurity content is 200 ppb or less in Na, Li, Fe, Al, Cu, Ca, Ni, B, Mg, Y, Ti and Cr, showing hardly any change from the impurity content before processing.

Then, in order to investigate changes in thickness, a similar transparent quartz glass tube 1 with an external diameter of 240 mm, a thickness of 4 mm, a length of 500 mm and an opening width of approximately 30 mm was used to produce a quartz glass plate by following a procedure similar to that described above with a rotating speed of 60 mm/min. In this case, the pulling speed was changed to: 50 mm/minute, 60 mm/minute, 65 mm/minute and 70 mm/minute. The resulting plate had differing thicknesses of 4.8 mm, 4.0 mm, 3.7 mm and 3.4 mm respectively. Thus, we succeeded in changing the thickness of the product. The flat plate formed in this way did not have any surface waviness and were otherwise good quality plate.

Industrial Applicability

With the present invention, a large, high-purity quartz glass plate as has been described so far, with no surface wariness, with a high degree of smoothness and flatness and free of bubbles can be easily and reliably obtained, offering a significant advantage in the production of square tanks for washing wafers and quartz glass reflectors.

What is claimed is:

1. A manufacturing method for large quartz glass plate, the method comprising the steps of:

providing a quartz glass tube having a circumferential wall with inner and outer surfaces and an opening of preselected width in the wall extending the entire length of the tube parallel to the longitudinal axis thereof whereby leading and trailing edges are formed in the wall of the tube;

mounting the tube for rotation about a fixed axis of rotation;

heating the wall of the tube in an initial zone at or adjacent to the leading edge to effect softening thereof;

rotating the quartz glass tube with a means of rotating and simultaneously pulling the heated leading edge of the quartz glass tube with a means of pulling in a direction approximately tangential to the circumference of the tube, thereby opening and flattening the tube to form a flat plate while effecting rotation thereof; and continuing heating and pulling of the tube as it is rotated to produce a quartz glass plate.

2. The manufacturing method for large quartz glass plate according to claim 1, wherein the step of heating at the initial zone is at the leading edge of said opening in the quartz glass tube.

3. The manufacturing method according to claim 2, wherein:

the quartz glass tube is pulled while the leading edge of the opening of said quartz glass tube is linked to said means of pulling by a quartz glass connecting piece.

4. The manufacturing method according to claim 2, wherein:

in the heating step the quartz glass tube is heated on both the inner and the outer surfaces of the tube wall.

5. The manufacturing method according to claim 2, wherein:

in the heating step, the quartz glass tube is softened over its entire length by applying seat with means for heating that reciprocates parallel to the longitudinal axis of the tube.

6. The manufacturing method according to claim 1, wherein:

said quartz glass tube is pulled at a speed approximately equal to the rotational speed of the circumferential wall of the quartz glass tube.

7. The manufacturing method according to claim 6, wherein:

the pulling speed is faster than the rotational speed of the circumferential wall of the quartz glass tube.

8. The manufacturing method according to claim 6, wherein:

the pulling speed is slower than the rotational speed of the circumferential wall of the quartz glass tube.

9. The manufacturing method according to claim 6, wherein:

said quartz glass tube is mounted by means providing isolation from chemical contamination by either the means of pulling or the means of rotating.

10. The manufacturing method for large quartz glass plate according to claim 1, wherein:

said quartz glass tube has a minimum diameter of 100 mm and a thickness of 2–20 mm.

11. The manufacturing method for large quartz glass plate according to claim 1, wherein:

said quartz glass tube is made of transparent synthetic quartz glass.

12. A manufacturing method for large quartz glass curved plate, the steps comprising:

providing a large flat quartz glass plate having one end defining a width of the flat quartz glass plate;

positioning the one end of the flat quartz glass plate at a heating position;

pulling the plate in an arcuate direction and through the heating position so as to heat consecutive portions of the flat quartz glass plate across said width of each portion, whereby as each portion of the flat quartz glass plate is heated, the flat quartz glass plate is pulled in the arcuate direction so as to form the quartz glass curved plate.

13. In an apparatus for manufacturing quartz glass plate, the combination comprising:

(a) means for supporting and rotating a quartz glass tube having a circumferential wall with inner and outer surfaces and a longitudinal opening of pre-selected width defined by leading and trailing edges which extend the entire length of the tube parallel to the longitudinal axis thereof, about a fixed axis of rotation;

(b) heating means positioned to apply heat to an area of said tube adjacent to the longitudinal opening during rotation thereof; and (c) pulling means for operable connection to the tube for effecting straightening thereof when it is heated.

14. The apparatus according to claim 13, wherein:

the heating means is positioned adjacent said leading edge which defines the longitudinal opening in the quartz glass tube;

the means for supporting and rotating rotates the quartz glass tube towards the heating means and;

the pulling means is positioned to pull the quartz glass tube in a line approximately tangential to said leading edge of said opening.

15. The apparatus for manufacturing quartz glass plate according to claim 13, wherein:

said pulling means is linked with said leading edge of said opening of said quartz glass tube by a quartz glass member.

16. The apparatus for manufacturing quartz glass plate as defined in claim 13, wherein:

said heating means comprises a pair of burner members or a pair of bar heating bodies that are positioned facing each other across said quartz glass tube.

17. The apparatus for manufacturing quartz glass plate as defined in claim 16, wherein said heating means comprises said pair of bar heating bodies; and drive means are operably connected to the bar heating bodies to effect oscillating thereof in a direction parallel to the longitudinal axis of the tube.

18. The apparatus as defined in claim 13, wherein:

said means for supporting and rotating the tube comprise means for supporting the quartz glass tube on the outer surface thereof and means operably connected thereto for rotating the tube about the longitudinal axis thereof.

19. The apparatus for manufacturing quartz glass plate according to claim 18, wherein:

said means operably connected to the means for supporting the quartz tube includes a rotating member that rotates centered on the longitudinal axis of the quartz glass tube.

* * * * *